United States Patent [19]
Elliott

[11] Patent Number: 5,935,509
[45] Date of Patent: Aug. 10, 1999

[54] PROCESS FOR MANUFACTURING FIBER PREFORMS AND AN APPARATUS FOR THE PROCESS

[75] Inventor: Donald M. Elliott, Brighton, Mich.

[73] Assignee: Cambridge Industries, Inc., Madison Heights, Mich.

[21] Appl. No.: 09/047,001

[22] Filed: Mar. 24, 1998

[51] Int. Cl.$^6$ .................................................. B27N 5/00
[52] U.S. Cl. .......................................... 264/517; 425/80.1
[58] Field of Search .............................. 264/517, 86, 87; 425/80.1, 84, 85

[56] References Cited

U.S. PATENT DOCUMENTS

| | | |
|---|---|---|
| 3,005,491 | 10/1961 | Wells . |
| 3,205,112 | 9/1965 | Gilbert . |
| 3,312,767 | 4/1967 | Morin . |
| 3,363,038 | 1/1968 | Billarant . |
| 3,424,603 | 1/1969 | Schwartz ................................. 427/250 |
| 3,813,763 | 6/1974 | Church ..................................... 29/596 |
| 4,097,977 | 7/1978 | Pollner ................................... 29/25.12 |
| 4,102,973 | 7/1978 | Hanning ................................. 264/272 |
| 4,318,879 | 3/1982 | Gartner .................................. 264/163 |
| 4,470,786 | 9/1984 | Sano et al. ............................. 425/125 |
| 5,122,046 | 6/1992 | Lavallee ................................. 425/116 |
| 5,192,387 | 3/1993 | Buckley .................................. 264/517 |
| 5,215,696 | 6/1993 | Weibel et al. ......................... 264/517 |
| 5,229,052 | 7/1993 | Billiu ..................................... 264/517 |
| 5,336,455 | 8/1994 | Kelman .................................. 264/517 |

*Primary Examiner*—Mary Lynn Theisen
*Attorney, Agent, or Firm*—Reising, Ethington, Barnes, Kisselle et al

[57] ABSTRACT

A process for forming a preform includes drawing a vacuum through a porous overform (16) from its outer surface toward its inner surface; providing retractable pins (32) that protrude through vertical extending sections (34) of the overform when in an extended position; depositing chopped fibers onto the outer surface of the overform such that the vertical extending sections of the overform have the fibers retained against sag by protruding sections (35) of the pins while said preform is formed; and retracting the pins from the vertical extending sections of the overflow in order to remove said preform from said overflow after cure. The invention is also directed to an apparatus for the use in manufacturing fibrous preforms that incorporates a porous overform (16) for receiving chopped fibers and binder material thereon and a plurality of pins (32) protruding through a vertically extending section (34) of the overform for engaging and supporting chopped fibers deposited onto the overform.

8 Claims, 1 Drawing Sheet

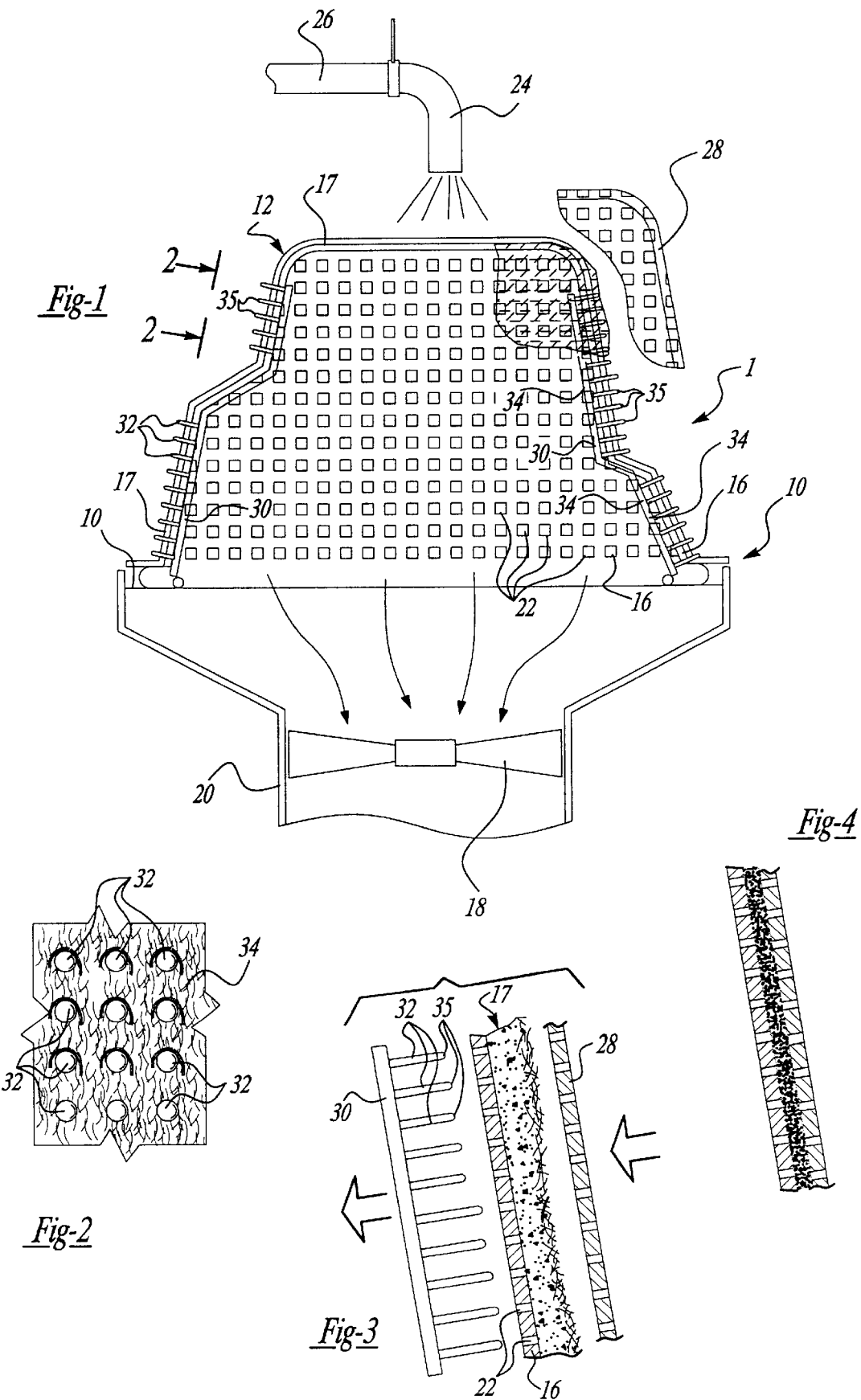

1

PROCESS FOR MANUFACTURING FIBER PREFORMS AND AN APPARATUS FOR THE PROCESS

TECHNICAL FIELD

The field of this invention relates to the field of directed fiber preforms and, more particularly to an improved process for forming a preform with oriented glass fibers.

BACKGROUND OF THE DISCLOSURE

Glass fibers have been commonly incorporated in thermoplastic molded and other cured plastics for added strength and durability. These molded plastic parts have been successfully adapted for many applications and are commonly molded into automotive interior trim parts such as instrument panel substrates and exterior bumper facades. The glass fiber is introduced in a mold where resinous plastic is then injected such that the glass fibers become imbedded into the final formed object.

It is now common to incorporate the glass fibers into a preform and then place the preform into the mold. The preform is made from chopped glass fibers of a desired length with the fibers sprayed or blown onto a porous overform. The glass fibers are secured in place against the porous overform via a vacuum applied through the screen. Immediately following the fiber placement, a binder agent is often sprayed on the fibers and allowed to cure which sets the fibers in place in the preform.

It is also known that if fibers are oriented along a longitudinal direction, the strength and rigidity of the finished article along the longitudinal direction is increased while providing relative flexure along the transverse direction. The amount of orientation obtained during a spray process of the fibers has been nominal. Up to now, increased orientation has been obtained through more expensive application methods such as laying down of the fibers or using a premade mat of fibers.

The preform shape may vary and range form a simple channel shape to a complex shape with many curves and vertical wall sections. Even with the vacuum applied onto the preform overform, the fibers may sag along any vertical wall section due to the force of gravity. The sag can be worse at longer vertical extending sections. Any sag of the preform is undesirable in that the sag causes loss of strength and structural integrity.

What is needed is a method for eliminating sag of the fibers on the vertical sections of the preform screen while providing an expeditious method for orienting the fibers on the vertical section of an overform.

SUMMARY OF THE DISCLOSURE

In accordance with one aspect of the invention, a process for forming a preform includes a step of drawing a vacuum through a porous support overform from its outer surface toward its inner surface. The support overform can be a rigid screen, perorated metal or other appropriate porous rigid material. Retractable pins are provided that protrude through vertical extending sections of the overform. Chopped fibers are deposited onto the outer surface of the overform such that the vertical extending sections of the overform have the fibers retained against sag by the pins while the preform is formed. The pins are then retracted in order to allow removal of the formed preform from the overform.

If chopped fibers are deposited in combination with dry powder binder, it is desirable to compress the fiber during the cure cycle by placing a second or outer overform onto the first mentioned overform to compress the fibers therebetween for a curing cycle. The outside overform is then removed to allow removal of the formed preform from the first mentioned overform.

Preferably, the pins are connected at their inner end to a common support structure located within the overform. It is desirable the distal ends of the pin protrude outward through the overform. The common support structure allows the pins to be retracted to the interior space of the overform in unison.

In accordance with another aspect of the invention, an apparatus for the use in manufacturing fibrous preforms includes a porous overform for receiving chopped fibers and binder material thereon, a plurality of pins protruding through a vertically extending section of the overform to engage and support chopped fibers deposited onto the overform, and the pins being retractable to allow a formed preform on the overform to be removed therefrom.

Preferably, the pins have a mounted end secured to a common support such that the pins move in unison between their respective protruding position and their retracted position. Preferably, the common support is located within the overform and the distal ends of the pins protrude through the overform to the exterior of the overform. The pins preferably are round straight rods.

An optional outer compression overform can be used to compress dry binder and glass fibers during the cure process.

In this fashion, an expeditious method and apparatus provides for oriented glass fibers along vertical wall sections of an overform with a reduction of sag to the applied fibers.

BRIEF DESCRIPTION OF THE DRAWINGS

Reference now is made to the accompanying drawings in which:

FIG. 1 is a schematic and fragmentary view of a preform apparatus in accordance with one embodiment of the invention;

FIG. 2 is a fragmentary side elevational view taken along lines 2—2 shown in FIG. 1;

FIG. 3 is a fragmentary schematic view of the preform apparatus illustrating the pins being retracted and a second compression overform placed over the overform 16; and FIG. 4 is a fragmentary view similar to FIG. 3 illustrating the compression overform compressing the fibers and dry powder binder against the overform 16.

DETAILED DESCRIPTION OF THE PREFERRED EMBODIMENT

Referring now to FIG. 1, a preform stand 10 for forming a fiber glass preform 12 includes a mounting table 14, a first overform 16 and a fan 18 for drawing a vacuum through overform 16 through ductwork 20. The overform 16 is porous and rigid enough against the vacuum and depositing of glass fibers to form a layer 17 thereon. The overform may be a metallic screen or perforated metal with and a plurality of holes 22 therethrough.

A nozzle 24 is operably movable about the over form 16 for spraying chopped glass fibers from a supply source (not shown) through duct 26 to form layer 17. An outer overform 28 is mounted and operably movable onto and off of overform 16 as discussed in more detail below.

A plurality of support panels 30 each having a plurality of straight rods 32 are mounted for movement within the interior of overform 16. The rods 32 are positioned to fit through the apertures 22 of vertical extending sections 34 of the overform 16.

Sections 34 are illustrated as being slightly canted from the vertical but may also be completely vertical. As shown more clearly in FIG. 2, the plurality rods 32 can be both vertically and horizontally spaced along the vertical section 34 of the overform 16 as clearly shown in FIG. 2. Each rod 32 has a substantial horizontal component. While each illustrated rod 32 is slightly canted, it may be completely horizontal.

The rods 32 extend through the overform 16 with its free distal ends 35 spaced more that the desired thickness of the sprayed fiber layer 17. During deposition of the glass fibers onto the overform 16, the rods 32 assist in maintaining the fibers in place against vertical extending wall sections 34. The rods 32 are spaced from one another so as not to impede the proper deposition of fibers onto the overform 16 vertical extending wall sections 34 but are sufficiently close together to give support to and prevent the fibers from sagging along vertical extending wall sections 34. Furthermore, the rods 32 allow the fibers to drape along the vertically extending wall sections 34 from each rod 32 thereby providing increased orientation of the fibers longitudinally along the vertical extending wall section 34.

Referring now, to FIG. 3, after deposition of the fiber layer 17 and a powder binder, the panel 30 is moved to retract the pins from the holes 22 in overform 16 and disengage from the fiber layer 17. The outer overform 28 is then placed over the overform 16 and the fiber layer 17 and moved into position to compress the fibers together for a more cohesive layer 17 as shown in FIG. 4. Depending on the shape of the preform, the overform 28 may have a variety of conventional ways to become positioned in proximity to the inside overform. The overform 28 can be a unitary member with an interior surface that matches the outer surface of the fiber layer 17. For other applications, the overform 28 may be multi-piece for more expeditious placement onto and removal from overform 16.

After the preform is cured, the outer overform 28 is then removed and the preform is free to be lifted from the overform 16 in a conventional fashion. The rods 32 are in their retracted position to assure free removal of the preform without interference.

One foreseen modification is depositing wet fibers onto the overform 16. The fibers are wetted with liquid binder. When wet fibers are used, compression by the outer overform 28 is not necessary. The wetness provides the needed compression and density of the fibers. The rods 32 are retracted before the curing of the fibers on the overform 16. After curing, the preform is then removed from overform 16 in a conventional fashion.

Other variations and modifications are possible without departing from the scope and spirit of the present invention as defined by the appended claims.

The embodiments in which an exclusive property or privilege is claimed are defined as follows:

1. A process for forming a preform characterized by the steps of:
   drawing a vacuum through a porous support overform from its outer surface toward its inner surface;
   providing retractable pins that protrude through vertically extending sections of the overform when in an extended position;
   depositing chopped fibers onto the outer surface of the overform such that the vertical extending sections of the overform have the fibers retained against sag by protruding sections of the pins while said preform is formed;
   retracting the pins from the vertical extending sections of said overform in order to remove said preform from said overform after cure.

2. A process as defined in claim 1 further characterized by:
   said pins being retractable to a position within the interior of said overform and having its distal end protruding through the overform when in the extended position.

3. A process as defined in claim 1 further characterized by the steps of:
   placing an outside compression overform onto said support overform and fibers to compress the fibers for a curing cycle;
   removing said outside compression overform and removing said preform from said porous overform.

4. A process as defined in claim 3 further characterized by:
   said pins being connected at their respective inner ends to a common support structure such that said pins can move in unison through said support overform.

5. A process as defined in claim 1 further characterized by:
   said pins being connected at their respective inner ends to a common support structure such that said pins can move in unison through said support overform.

6. An apparatus for the use in manufacturing fibrous preforms, said apparatus characterized by:
   a porous support overform for receiving chopped fibers and binder material thereon;
   a plurality of pins protruding through a vertically extending section of said support overform for engaging and supporting chopped fibers deposited onto said support overform, said pins being retractable to allow a formed preform on said support overform to be removed therefrom.

7. An apparatus as defined in claim 6 further characterized by:
   said pins having an inner section secured to a support within the interior of said support overform and said pins having their respective distal free end extending through and out of said overform such that said pins move in unison between their protruding position and their retracted position.

8. An apparatus as defined in claim 7 further characterized by:
   said pins being round straight rods.

* * * * *